US012584941B1

(12) United States Patent
Noh et al.

(10) Patent No.: US 12,584,941 B1
(45) Date of Patent: Mar. 24, 2026

(54) MEASUREMENT SYSTEM WITH DETECTION MECHANISM AND METHOD OF OPERATION THEREOF

(71) Applicant: Park Systems Corp., Suwon (KR)

(72) Inventors: Hanaul Noh, Mountain View, CA (US); Chih-Chieh Hsieh, San Jose, CA (US); Myunghoon Choi, Santa Clara, CA (US); Stefan Kaemmer, Santa Barbara, CA (US)

(73) Assignee: Park Systems Corp., Suwon (KR)

( * ) Notice: Subject to any disclaimer, the term of this patent is extended or adjusted under 35 U.S.C. 154(b) by 0 days.

(21) Appl. No.: 19/395,826

(22) Filed: Nov. 20, 2025

(51) Int. Cl.
　　*G01Q 40/00*　　(2010.01)
　　*G01Q 60/38*　　(2010.01)

(52) U.S. Cl.
　　CPC ............. *G01Q 40/00* (2013.01); *G01Q 60/38* (2013.01)

(58) Field of Classification Search
　　CPC ............................... G01Q 40/00; G01Q 60/38
　　USPC ..... 850/7, 19, 21, 33, 37, 38, 39, 46, 62, 63
　　See application file for complete search history.

(56) References Cited

U.S. PATENT DOCUMENTS

| | | | |
|---|---|---|---|
| 8,266,718 B2 | 9/2012 | Lai et al. | |
| 8,307,461 B2 | 11/2012 | Li et al. | |
| 8,661,560 B1 | 2/2014 | Li et al. | |
| 9,213,047 B2 | 12/2015 | Li et al. | |
| 9,291,640 B2 | 3/2016 | Su et al. | |
| 9,322,842 B2 | 4/2016 | Hu et al. | |
| 10,060,862 B2 | 8/2018 | Cui et al. | |
| 10,228,388 B2 | 3/2019 | Prater et al. | |
| 10,274,513 B2 | 4/2019 | Friedman et al. | |
| 10,473,694 B2 | 11/2019 | Friedman et al. | |
| 2012/0192319 A1 | 7/2012 | Li et al. | |
| 2013/0276174 A1 | 10/2013 | Li et al. | |
| 2014/0230103 A1 | 8/2014 | Su et al. | |
| 2014/0283229 A1 | 9/2014 | Hu et al. | |
| 2017/0299525 A1 | 10/2017 | Cui et al. | |
| 2018/0120344 A1 | 5/2018 | Prater et al. | |
| 2018/0217181 A1* | 8/2018 | Friedman ............... G01Q 60/30 |
| 2019/0234993 A1 | 8/2019 | Friedman et al. | |

OTHER PUBLICATIONS

Jun-Yi Shan, Nathaniel Morrison, Su-Di Chen, Feng Wang, Eric Y. Ma, Johnson-noise-limited cancellation-free microwave impedance microscopy with monolithic silicon cantilever probes; pp. 1-8; Nature Communications, Published online Jun. 13, 2024; © The Author(s) 2024; https://doi.org/10.1038/s41467-024-49405-8.
Primenano, Inc.; "Products", 2024 [retrieved on Nov. 3, 2025]. Retrieved from the Internet: https://primenanoinc.com/products/.

* cited by examiner

*Primary Examiner* — Jason L Mccormack

(74) *Attorney, Agent, or Firm* — Perspectives Law Group, Corp.

(57)　　　ABSTRACT

A method of operation of a measurement system includes: capturing a probe measurement associated with a key, where the probe measurement is a first response or a second response based on a first microwave excitation or a second microwave excitation, respectively; generating a first channel voltage or a second channel voltage based on the first response or the second response, respectively; determining a phase offset based on the first channel voltage; storing the phase offset associated with the key; and calibrating the probe measurement by adjusting a phase based on computation of the second channel voltage with the phase offset accessed by the key.

20 Claims, 7 Drawing Sheets

① BY DEFAULT

② CALIBRATION

SINGLE TIME CALCULATION $$R = \sqrt{RE^2 + IM^2}$$

$$\theta_0 = TAN^{-1}\left(\frac{IM}{RE}\right)$$

- NO PHASE SHIFTER
- NO SCANNING OR SWEEPING

③ MEASURE DUT

SIGNAL $$\theta_S = \theta - \theta_0$$

$$\left( \begin{array}{l} RE = R \cdot COS\ \theta_S \\ IM = R \cdot SIN\ \theta_S \end{array} \right)$$

700

CAPTURING PROBE MEASUREMENT 702

GENERATING FIRST CHANNEL VOLTAGE 704

DETERMINING PHASE OFFSET 706

STORING PHASE OFFSET 708

CALIBRATING PROBE MEASUREMENT 710

MEASUREMENT SYSTEM WITH DETECTION MECHANISM AND METHOD OF OPERATION THEREOF

TECHNICAL FIELD

An embodiment of the present invention relates generally to a measurement system, and more particularly to a system with a detection mechanism.

BACKGROUND

In the field of microscopy and material characterization, atomic force microscopy (AFM) and related techniques such as Scanning Microwave Impedance Microscopy (SMIM) can be used to measure surface features and electrical responses of materials. These methods are applied in areas including semiconductor research, materials development, and biological studies to obtain information about physical and electrical characteristics of a sample.

Thus, a need still remains for a measurement system with detection mechanisms that delivers high spatial resolution together with stable, quantitative performance across multiple imaging modes and a range of materials. In view of the ever-increasing commercial competitive pressures, along with growing manufacturing needs, manufacturing expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a measurement system including: an impedance detection unit configured to: capture a probe measurement associated with a key, where the probe measurement is a first response or a second response based on a first microwave excitation or a second microwave excitation, respectively; generate a first channel voltage or a second channel voltage based on the first response or the second response, respectively; determine a phase offset based on the first channel voltage; store the phase offset associated with the key; and calibrate the probe measurement by adjusting a phase based on computation of the second channel voltage with the phase offset accessed by the key.

An embodiment of the present invention provides a method of operation of a measurement system including: capturing a probe measurement associated with a key, where the probe measurement is a first response or a second response based on a first microwave excitation or a second microwave excitation, respectively; generating a first channel voltage or a second channel voltage based on the first response or the second response, respectively; determining a phase offset based on the first channel voltage; storing the phase offset associated with the key; and calibrating the probe measurement by adjusting a phase based on computation of the second channel voltage with the phase offset accessed by the key.

An embodiment of the present invention provides a non-transitory computer-readable medium storing an instruction that, when executed by a control circuit of a measurement system, causes the control circuit to perform functions including: capturing a probe measurement associated with a key, where the probe measurement is a first response or a second response based on a first microwave excitation or a second microwave excitation, respectively; generating a first channel voltage or a second channel voltage based on the first response or the second response, respectively; determining a phase offset based on the first channel voltage; storing the phase offset associated with the key; and calibrating the probe measurement by adjusting a phase based on computation of the second channel voltage with the phase offset accessed by the key.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
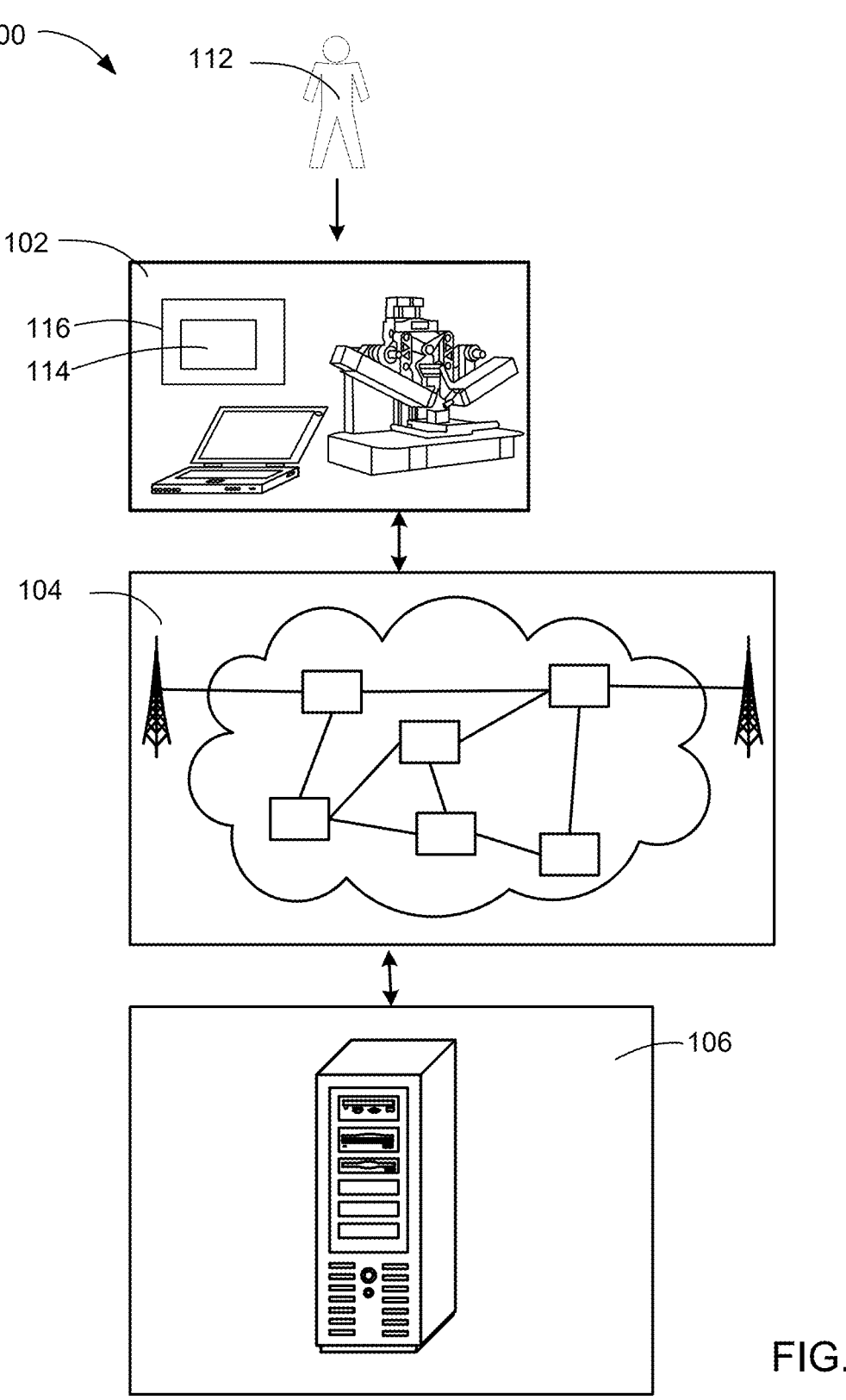
FIG. 1 is an example of a system architectural diagram of a measurement system with a detection mechanism in an embodiment of the present invention.

Description of various embodiments of the present invention is described with an example of development of an atomic force microscope (AFM) system incorporating a Scanning Microwave Impedance Microscopy (SMIM) module that implements phase calibration with a probe configured to detect mechanical and microwave responses of a sample.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, certain circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The embodiments can be numbered as first embodiment, second embodiment, etc. or can be described without a numeric designation as a matter of descriptive convenience and are not intended to have any other significance or provide limitations for an embodiment of the present invention. The terms first, second, etc. or without a numeric designation can be used throughout as part of element names and are used as a matter of descriptive convenience and are not intended to have any other significance or provide limitations for an embodiment.

The term "module" or "unit" or "circuit" or "mechanism" referred to herein can include or be implemented as or include software running on specialized hardware, hardware, or a combination thereof in the present invention in accordance with the context in which the term is used. For example, the software can provide instructions and can be implemented as machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" or a "circuit" is written in the claims section below, the "unit" or the "circuit" is deemed to include hardware circuitry for the purposes and the scope of the claims.

For example, the hardware can include an atomic force microscope (AFM) head assembly, cantilevers or probes with conductive or metal-coated tips, piezoelectric scanners for positioning and feedback control, microwave transmission lines or coaxial feed structures for signal delivery, impedance-matching networks, microwave sources and detectors, low-noise amplifiers, mixers, and demodulators for signal processing, or a combination thereof.

Also for example, the hardware can include vibration-isolation platforms, environmental enclosures, signal-conditioning circuits, controller and feedback electronics, lock-in amplifiers, data-acquisition units, or other components for AFM and Scanning Microwave Impedance Microscopy (SMIM) measurements, or a combination thereof.

As a specific example, the excitation sources can include microwave signal generators, vector network analyzers (VNAs), or frequency synthesizers configured to provide continuous-wave or modulated microwave excitations, impedance-matched through transmission lines or couplers to the probe. As another specific example, the excitation sources can include broadband microwave sources, mixers, or oscillators configured for amplitude or frequency modulation, phase control, or impedance calibration, any other microwave excitation sources, or a combination thereof.

The module, units, circuits, or mechanism in the following description of the embodiments can be coupled or attached to one another as described or as shown, as examples. The coupling or attachment can be direct or indirect without or with intervening items between coupled or attached modules or units or circuits or mechanisms. The coupling or attachment can be by physical contact or by communication between modules or units or circuits or mechanisms, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architectural diagram of a measurement system 100 with a detection mechanism 116 in an embodiment of the present invention. One or more embodiments address measurement functions of the measurement system 100 as a distributed platform in which exchanges of commands and data with a detection mechanism 116 across a network topology. One or more embodiments address AFM and Scanning Microwave Impedance Microscopy (SMIM) measurement functions of the measurement system 100 as a distributed platform in which commands and data are exchanged among the first device 102, the second device 106, the detection mechanism 116, or a combination thereof over the network 104.

The measurement system 100 can include a first device 102, such as a client or a server, connected to a second device 106, such as a client or server. The first device 102 can communicate with the second device 106 through a network 104, such as a wireless or wired network. For example, the first device 102 that implements the AFM/SMIM instrument and a local controller is connected to the second device 106.

For example, the first device 102 can be of any of a variety of computing devices, such as a measurement equipment, a computer, a notebook computer, or other multi-functional device. Also, for example, the first device 102 can be included in a device or a sub-system. As a specific example, the first device 102 can be an atomic force microscope (AFM) including a Scanning Microwave Impedance Microscopy (SMIM) module or any other scanning probe microscopy instrument.

For example, the first device 102 can function as an atomic force microscope (AFM).

As an example, the first device 102 positions a probe or cantilever tip near or in contact with a sample 114, measures the interaction forces between the probe and the sample 114, and detects corresponding deflection or response signals. In an embodiment, the first device 102 includes a SMIM circuit coupled to the probe to apply a microwave excitation to the sample 114 and detect the reflected or transmitted microwave signal from a tip-sample interaction. Also for example, the collected signals can include mechanical response data, SMIM baseband channels (e.g., in-phase and quadrature or capacitance and conductance), impedance data, or a combination thereof, which are processed to produce maps of topography, permittivity, conductivity, or other electrical or material parameters of the sample 114. As an example, data acquisition and image formation can be performed during contact or non-contact scanning modes including off-resonance tapping and/or lift-mode passes. As another example, the second device 106 can perform impedance extraction, data reconstruction, calibration (including phase calibration in SMIM), or analysis using signal-processing algorithms, artificial intelligence (AI) models, machine-learning models, or other computational techniques For example, the user 112 supplies the sample 114 to the first device 102 with the detection mechanism 116, and the first device 102 captures response signals from the sample 114 and processes data generated from the signals. The detection mechanism 116 includes AFM scanner and probe-control electronics, feedback circuitry, and SMIM microwave excitation and demodulation circuitry to drive a probe with a mechanical and microwave excitation, detecting responses corresponding to tip-sample interactions, and analyzing the detected responses to determine material and electrical information of the sample 114. As another example, the first device 102 can perform all computations locally or, via the network 104, off-load part of the computation workload or share the local computation results with the second device 106 with a higher processing capacity for additional processing and storage, including phase calibration and impedance-map generation.

For illustrative purposes, the sample 114 is shown in the detection mechanism 116, although it is understood that the sample 114 can be outside of the detection mechanism 116.

For example, the sample 114 can be mounted on a stage or chuck of the AFM with a SMIM module or SMIM system and provided to the first device 102 to be characterized or tested.

For illustrative purposes, the detection mechanism 116 is shown in the first device 102, although it is understood that the detection mechanism 116 can be implemented in a different manner. For example, the detection mechanism 116 can be distributed between the first device 102 and the second device 106. Also for example, the first device 102 can include multiple probes and/or multiple instruments that independently operate AFM or SMIM probes for parallel measurements across multiple samples 114, and the collected information for all of the samples 114 can be transferred to the second device 106 for combined analysis or comparison.

The first device 102 can couple, either directly or indirectly, to the network 104 to communicate with the second device 106 or can be a stand-alone device. The first device 102 can further be separated from or incorporated with a smart phone, a tablet computer, a desktop, a laptop computer, a scanner, or other personal electronic devices or can include an embedded controller within the instrument chassis.

The second device 106 can be any of a variety of centralized or decentralized computing devices. For example, the second device 106 can be a computer, workstation, server, grid computing resources, a virtualized computer resource, cloud computing resource, routers, switches, peer-to-peer distributed computing devices, or a combination thereof. In an embodiment, the second device 106 can execute image-processing, impedance-mapping, phase calibration, or data-classification software for AFM or SMIM datasets.

The second device 106 can be centralized in a single room, distributed across different rooms, distributed across different geographical locations, embedded within a telecommunications network, on-premises, or remote. The second device 106 can couple with the network 104 to communicate with the first device 102. The second device 106 can also be a client type device as described for the first device 102. For example, the second device 106 can receive the SMIM baseband data or AFM deflection signals and perform advanced analysis, visualization, or data storage.

Also, for illustrative purposes, the measurement system 100 is described with the second device 106 as a computing device, although it is understood that the second device 106 can be different types of devices. Also, for illustrative purposes, the measurement system 100 is shown with the second device 106 and the first device 102 as endpoints of the network 104, although it is understood that the measurement system 100 can include a different partition between the first device 102, the second device 106, and the network 104. For example, the first device 102, the second device 106, or a combination thereof can also function as part of the network 104 and host services for instrument control, data streaming, and user interfaces.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, a user 112 can utilize the first device 102 to initiate or supervise a measurement sequence of a sample 114, while the second device 106 can receive sensed measurement information, execute analytical routines, and return processed measurement information to the user 112. As an example, the user 112 can be an operator, a laboratory technician, an engineer, a scientist, or any other users of the measurement system 100. Also as an example, the second device 106 can be implemented as centralized or decentralized computing resources. This partition of control and computation can allow AFM and SMIM measurements to be performed locally while remote or higher-level devices perform impedance analysis, calibration, device health monitoring, or visualization of results.

For example, the second device 106 can host portions of the detection mechanism 116 for executing the analytical routines using the sensed measurement information. As an example, the detection mechanism 116 can include a probe control circuit, feedback electronics, and SMIM detection circuitry including microwave excitation, quadrature demodulation, and impedance-analysis components. Further details for operations, components, and technical aspects of the detection mechanism 116 will be described below in the description of the measurement system 100.

Figure 2:
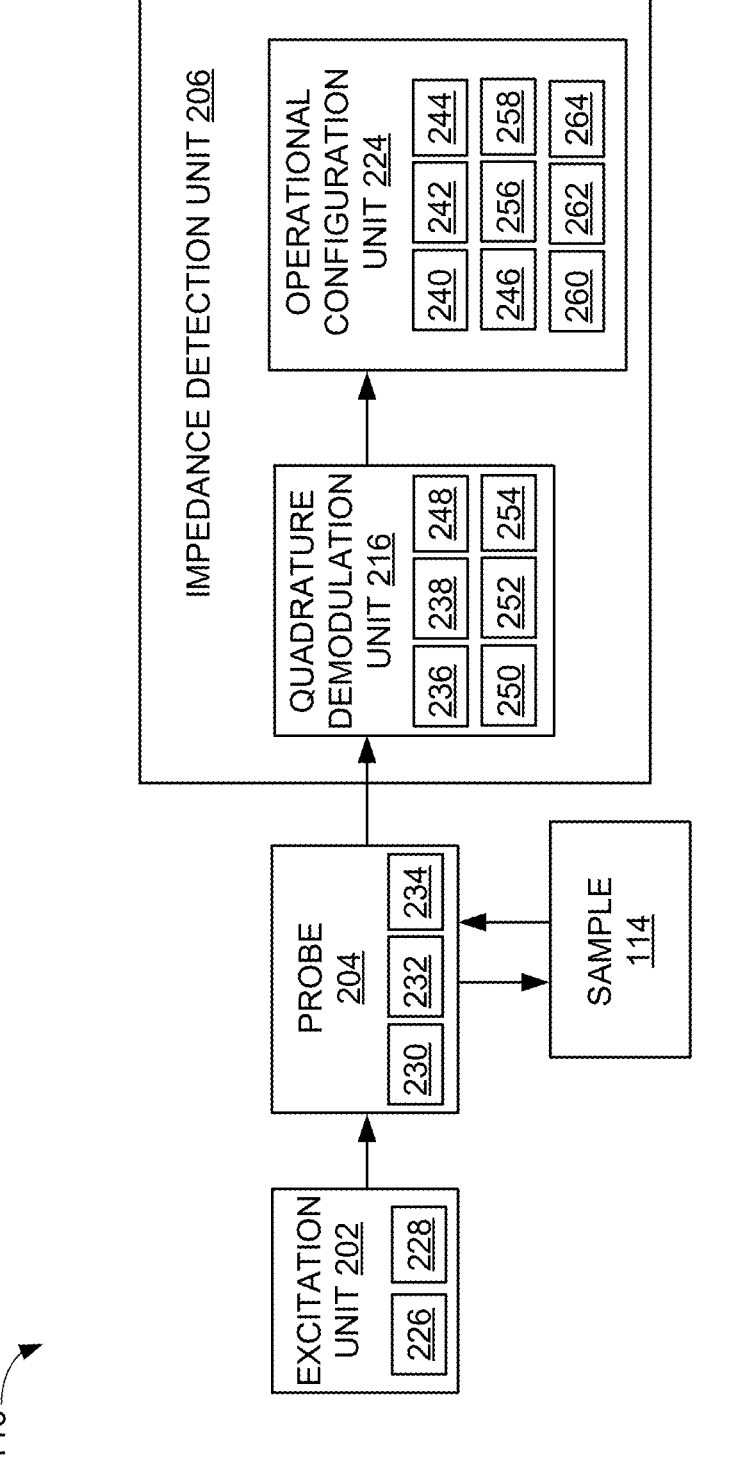
FIG. 2 is an example of a block diagram of the detection mechanism operating within the measurement system.

Referring now to FIG. 2, therein is shown an example of a block diagram of the detection mechanism 116 operating within the measurement system 100 of FIG. 1. The detection mechanism 116 can include an excitation unit 202, a probe 204, a sample 114, and an impedance detection unit 206 that are electrically or functionally coupled together for performing measurement operations. The detection mechanism 116 can implement phase calibration in SMIM, in which the impedance detection unit 206 determines a system phase offset from a first channel voltage, stores the system phase offset in a memory under a key associated with probe and excitation settings, and applies the stored system phase offset to subsequent channel voltages in real time to generate phase-corrected SMIM images. Phase calibration can be performed at a single user-selected point, either in air or at an approached Z position, and the captured phase at that point is stored as the system phase offset keyed to probe or frequency for real-time subtraction during measurement.

For example, generation of phase-corrected SMIM images in real time refers to processing with deterministic, bounded latency (e.g., with a configurable maximum delay) so that a computed result is available during an ongoing acquisition rather than deferred to offline or batch processing. In an AFM/SMIM context, the real time processing can indicate that calibration and image updates are completed within the dwell time of the current acquisition cycle before the next acquisition cycle begins.

By way of an example, the excitation unit 202 is an electronic module configured to generate a controlled microwave excitation and to deliver the microwave excitation to the probe 204, including a first microwave excitation 226 and a second microwave excitation 228. By way of an example, the probe 204 is a scanning probe assembly configured to apply the microwave excitation to the sample 114 and to sense corresponding mechanical responses, microwave responses, or a combination thereof from a tip-sample interaction. The probe 204 can include an AFM cantilever with a conductive or metal-coated tip.

By way of an example, the impedance detection unit 206 is a signal-processing module configured to receive mechanical responses, microwave responses, or a combination thereof from the probe 204. The impedance detection unit 206 can generate conditioned baseband channel voltages, including a first channel voltage 236 and a second channel voltage 238, that represent impedance-related properties of the sample 114. The impedance detection unit 206 can include demodulation, filtering, amplification stages, or a combination thereof for generating conditioned baseband channel voltages.

The impedance detection unit 206 can include a quadrature demodulation unit 216 and an operational configuration unit 224. By way of an example, the quadrature demodulation unit 216 is a circuit configured to multiply the microwave response by phase-coherent reference signals to produce in-phase and quadrature (I/Q) baseband components (or equivalent capacitance/conductance channels) for further conditioning. By way of an example, the operational configuration unit 224 is a digital control module configured to orchestrate scanning and timing, coordinate the excitation unit 202 and the impedance detection unit 206, command constant frequency/power settings, execute phase calibration in real time, or a combination thereof. This digital phase-calibration flow does not use an analog phase shifter and does not require scanning or Z-sweeping to establish the phase offset computed from I/Q and then subtracted in real time. By eliminating the analog phase shifter, the measurement system 100 avoids the RF-bandwidth limitations of active shifters and the usability constraints of passive, knob-adjusted shifters.

It has been discovered that the quadrature demodulation unit 216 and the operational configuration unit 224 can execute SMIM phase calibration digitally. The quadrature demodulation unit 216 can provide in-phase and quadrature voltages, and the operational configuration unit 224 can compute a magnitude 260 and an uncalibrated phase, determine and store a one-time system phase offset 240, and subtract the stored phase offset 240 in real time via the key 244, thereby eliminating analog phase-shifter adjustments, reducing setup time, and broadening usable RF bandwidth.

The probe 204 can interact with the sample 114 mechanically while receiving microwave energy from the excitation unit 202 and returning a microwave response that encodes the local impedance at the tip-sample junction. The probe 204 can capture a probe measurement 234 including a first response 230 during application of the first microwave excitation 226 and a second response 232 during application of the second microwave excitation 228. By way of an example, the first response 230 and the second response 232 are microwave signals that have been altered by the tip-sample interaction. By way of an example, the probe measurement 234 is an electrical response derived from the probe 204.

The quadrature demodulation unit 216 can perform signal mixing between the first response 230, the second response 232, or a combination thereof and reference signals that have predetermined amplitude and phase relationships. The first response 230, the second response 232, or a combination thereof can be multiplied by phase-coherent in-phase and quadrature (I/Q) reference signals in the quadrature demodulation unit 216 to translate signals from the microwave carrier to baseband.

The probe 204 can provide the probe measurement 234 to the quadrature demodulation unit 216 for downstream processing by the impedance detection unit 206. The probe measurement 234 can include a voltage proportional to a reflected or transmitted microwave signal that represents local sample properties sensed at a tip-sample junction between a tip of the probe 204 and the sample 114.

The quadrature demodulation unit 216 can convert the microwave responses from the probe 204 into baseband electrical signals for analysis and imaging. The quadrature demodulation unit 216 can generate a first channel voltage 236 based on the first response 230 and can generate a second channel voltage 238 based on the second response 232. By way of an example, the first channel voltage 236 and the second channel voltage 238 are baseband signals produced after demodulating the microwave responses to obtain information that correlates with local capacitance and conductance of the sample 114. The first channel voltage 236 can include a first in-phase voltage 248 and a first quadrature voltage 250. The second channel voltage 238 can include a second in-phase voltage 252 and a second quadrature voltage 254. For example, in-phase and quadrature voltages are two perpendicular measurements of the same signal that are 90° apart, which are used to compute amplitude and phase.

The impedance detection unit 206 can be implemented using resistor-capacitor (RC) circuit networks at one or more stages to realize time constants that set demodulation bandwidth, noise filtering, and output shaping. By way of an example, an RC network is a combination of resistors and capacitors that creates a time constant $\tau = R \times C$ used to establish a cutoff frequency, integrate or differentiate a signal, or introduce a controlled phase shift.

The quadrature demodulation unit 216 can include RC networks at the mixer outputs to form baseband smoothing/anti-alias filters and, in analog-reference embodiments, can include RC all-pass phase-shift networks to generate or trim the in-phase and 90-degree quadrature references. The mixing element (e.g., a chopper/switching mixer or analog multiplier) can be active, while the immediate post-mixer low-pass sections can be implemented with RC networks to remove residual carrier and high-frequency products before further conditioning.

The operational configuration unit 224 can perform phase calibration in SMIM to correct system-induced phase effects. The operational configuration unit 224 can determine a phase offset 240 based on the first in-phase voltage 248 and the first quadrature voltage 250 and can store the phase offset 240 associated with a key 244. By way of an example, the phase offset 240 is a calibration angle representing a phase shift. By way of an example, the key 244 is an identifier used to retrieve a calibration value such as the stored phase offset 240. The operational configuration unit 224 can then calibrate the probe measurement 234 by adjusting a phase 242 based on computation of the second in-phase voltage 252 and the second quadrature voltage 254 with the stored phase offset 240 accessed via the key 244.

The operational configuration unit 224 can form the key 244 based on identifiers of the current configuration, including a probe identifier 256 and an excitation frequency identifier 258. For example, the operational configuration unit 224 uses the probe identifier 256, the excitation frequency identifier 258, or a combination thereof as inputs to construct the key 244 that indexes and retrieves the stored phase offset 240 from a memory (e.g., volatile, non-volatile, persistent memory, etc.) for the present probe and frequency. By way of an example, the probe identifier 256 is a label that identifies the probe 204. By way of an example, the excitation frequency identifier 258 is a label that identifies the drive frequency of the microwave excitation for the current measurement.

For example, the probe identifier 256 includes a probe serial number, type, vendor, model, or any other designation of the probe 204. Also for example, the probe identifier 256 includes a tip-coating type, a thickness class, a tip-radius band, a cantilever geometry and spring-constant or resonance-frequency class, a lot/batch code, a controller-assigned unique identification (ID) that links to a stored calibration file for the probe 204, or any other designation of the probe 204.

For example, the excitation frequency identifier 258 includes a drive frequency label or any other frequency identification of the microwave excitation. Also for example, the excitation frequency identifier 258 includes a numeric drive frequency in hertz, a synthesizer channel or PLL lock-point label, a frequency-sweep step/index, a harmonic or sideband index, an offset from a nominal frequency, or any other frequency designation of the microwave excitation.

The operational configuration unit 224 can associate each generated channel voltage with the position of the probe 204. The operational configuration unit 224 can use a probe position 246 during acquisition of the first channel voltage 236. By way of an example, the probe position 246 is a set of coordinates or indices representing a location of the probe 204. The probe position 246 can include a location relative to the sample 114. The operational configuration unit 224 can use the probe position 246 to gate acquisition windows for the quadrature demodulation unit 216 and to index each acquisition into the correct spatial location, so the first channel voltage 236, including the first in-phase voltage 248 and the first quadrature voltage 250, is generated and recorded in the memory correspondence with the probe position 246 relative to the sample 114.

The operational configuration unit 224 can compute a magnitude 260 from in-phase and quadrature components. The operational configuration unit 224 can output the magnitude 260 together with the calibrated phase 242. By way of an example, the magnitude 260 is a scalar derived from in-phase and quadrature voltages and represents the strength of the SMIM signal. The operational configuration unit 224 can compute the magnitude 260 from the first in-phase voltage 248 and the first quadrature voltage 250. The operational configuration unit 224 can compute the magnitude 260 from the second in-phase voltage 252 and the second quadrature voltage 254. Expressing SMIM outputs as the magnitude 260 and the calibrated phase 242 improves interpretability and supports more quantitative analysis, including non-linear and spectroscopic SMIM modes.

The operational configuration unit 224 can persist calibration parameters for later automatic use. The operational configuration unit 224 can store the phase offset 240 in a transform store 262 keyed by the key 244. By way of an example, the transform store 262 is a table of calibration parameters indexed by the probe identifier 256, the excitation frequency identifier 258, or a combination thereof so the parameters are auto-recalled when the probe or RF frequency changes. The transform store 262 can be located in a non-volatile memory 264 so that the parameters persistently stored and retained during power cycles. By way of an example, the non-volatile memory 264 is a persistent memory device (e.g., flash, NAND, FRAM, or any other non-volatile types of memory) that retains the stored transform entries.

For example, the measured in-phase (RE—real) and quadrature-phase (IM—imaginary) signals, including the first in-phase voltage 248 and the first quadrature voltage 250, are converted to the magnitude 260 and an angle of the complex vector and recorded as a system phase offset 240. The system phase offset 240 can be calculated instantly at a reference position and subtracted during measurements in real time.

It has been discovered that persisting the system phase offset 240 in a transform store 262 keyed by the probe identifier 256, the excitation frequency identifier 258, or a combination thereof can enable automatic recall when the probe 204 or frequency changes, maintaining quantitative consistency across sessions. Further, because the magnitude 260 derives from I/Q, the magnitude 260 can remain invariant to phase rotation, providing a stable amplitude baseline while the calibrated phase 242 is updated in real time.

Figure 3:
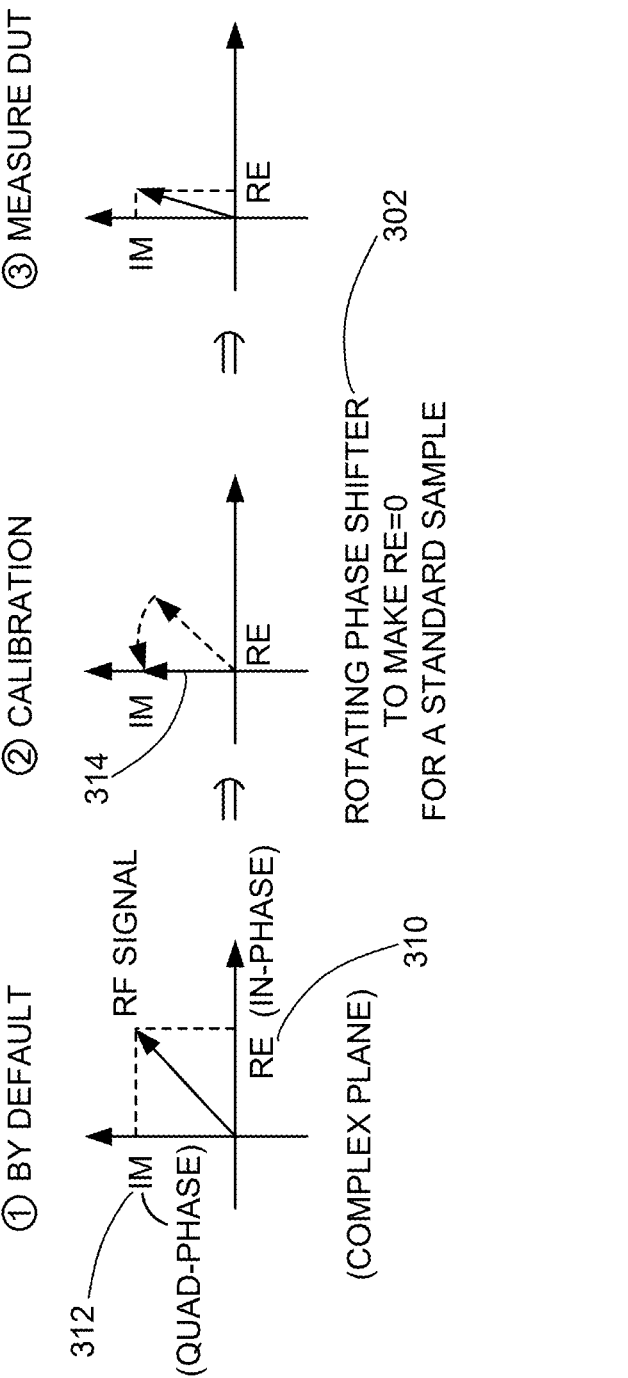
FIG. 3 is an example of a phase-shifter-based calibration mode for SMIM.

Referring now to FIG. 3, therein is shown an example of a phase-shifter-based calibration mode for SMIM. The electronics can include an analog phase shifter 302 coupled to the coherent reference used by the quadrature demodulation unit 216 of FIG. 2. The phase shifter 302 can rotate the reference phase so that the demodulated channel outputs produced by the quadrature demodulation unit 216 are correspondingly rotated in the complex plane (real vs. imaginary).

The left portion of FIG. 3 illustrates a starting or default condition in which the analog phase shifter 302 is at an arbitrary setting. The quadrature demodulation unit 216 can demodulate the probe 204 of FIG. 2 response into a real in-phase channel 310 (RE) and an imaginary quadrature channel 312 (IM). Because the reference phase is not yet aligned, the measured signal can appear with non-zero components on both channels with the vector at an arbitrary angle in the RE-IM plane.

The middle portion of FIG. 3 illustrates the phase shifter 302 can be adjusted while the system acquires data so that the real in-phase channel 310 trends toward a flat-response condition 314. The adjustment can be performed while scanning the sample 114 of FIG. 1 laterally or during a vertical motion such as a z-distance ramp of the probe 204 relative to the sample 114. The phase shifter 302 can be tuned using the observed behavior of the real in-phase channel 310 versus position. The system can monitor the DC level or slope of the real in-phase channel 310 along the lateral scan or versus the z-distance ramp and continue rotating the phase shifter 302 until the measured level or slope falls below a selected threshold, which indicates the flat-response condition 314.

The right portion of FIG. 3 illustrates that after the flat-response condition 314 is reached, the phase shifter 302 can be held at the calibrated setting while measuring the sample 114. The quadrature demodulation unit 216 can continue to generate the real in-phase channel 310 and the imaginary quadrature channel 312, with the calibrated phase appears primarily on the imaginary quadrature channel 312 while the real in-phase channel 310 remains near a zero baseline.

Figure 4:
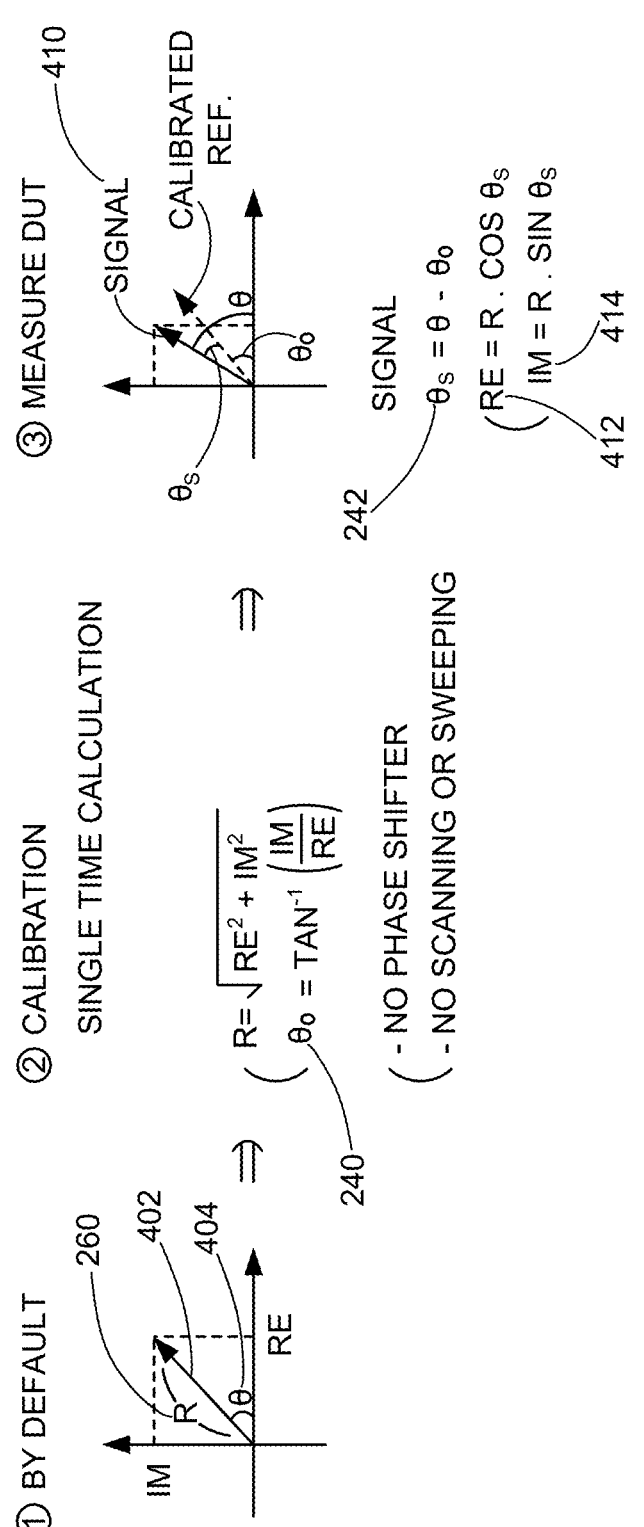
FIG. 4 is an example of a phase calibration mode of the detection mechanism.

Referring now to FIG. 4, therein is shown an example of a phase calibration mode of the detection mechanism 116 of FIG. 1. For example, the left portion of FIG. 4 illustrates the demodulated SMIM signal before calibration. The quadrature demodulation unit 216 of FIG. 2 can output in-phase (RE) and quadrature (IM) components that form an uncalibrated complex vector 402. The RE and IM components can correspond to the in-phase and quadrature voltages generated by the quadrature demodulation unit 216 including the first in-phase voltage 248 of FIG. 2 and the first quadrature voltage 250 of FIG. 2 when processing the first pass, and the second in-phase voltage 252 of FIG. 2 and the second quadrature voltage 254 of FIG. 2 when processing the second pass. The operational configuration unit 224 of FIG. 2 can compute the magnitude 260 (R) based on the first in-phase voltage 248 and the first quadrature voltage 250 when processing the first pass. The operational configuration unit 224 can compute an uncalibrated phase 404 (θ) from the current RE and IM and can retain that angle as θ for later use in calibration and reconstruction.

By way of an example, the uncalibrated phase 404 (θ) is an angle that the operational configuration unit 224 computes based on in-phase and quadrature voltages output by the quadrature demodulation unit 216 before subtraction of the system phase offset 240. The uncalibrated phase 404 (θ) can be computed by the operational configuration unit 224 as $\theta = \tan^{-1}(IM/RE)$ during subsequent measurements of the sample 114 of FIG. 1 using the second in-phase voltage 252 (RE) and the second quadrature voltage 254 (IM). The uncalibrated phase 404 can represent the current orientation of the uncalibrated complex vector 402 (RE, IM) and can be retained as θ for use with the magnitude 260 and for generating the calibrated phase 242 by subtracting the system phase offset 240 from the uncalibrated phase 404 in real time.

For example, the middle portion of FIG. 4 illustrates a one-time instant calibration. The operational configuration unit 224 can perform a single-time calibration at a reference position such as the probe position 246 of FIG. 2 by computing a magnitude 260 and a system phase offset 240 from the RE and IM components at that position and storing the phase offset 240 under the key 244 of FIG. 2 formed based on the probe identifier 256 of FIG. 2, the excitation frequency identifier 258 of FIG. 2, or a combination thereof.

The equations of the magnitude 260 and the phase offset 240 are $R = \sqrt{RE^2 + IM^2}$ and $\theta_0 = \tan^{-1}(IM/RE)$, respectively, where RE and IM are the first in-phase voltage 248 and the first quadrature voltage 250 output by the quadrature demodulation unit 216. This calibration can complete within the acquisition dwell time and can be executed without the analog phase shifter 302 of FIG. 3 and without scanning or sweeping. A calibrated reference baseline can result when $\theta_0$ is applied at the reference position.

It has been discovered that, instead of using an analog phase shifter to nullify the phase offset, in-phase and quadrature components from the RF electronics are directly used to calculate the magnitude and angle of an RF signal. With the converted signals, the phase-calibration process is simplified to a one-time subtraction in angle without recursive adjustments of a phase shifter. The quadrature demodulation unit 216 provides RE/IM, the operational configuration unit 224 computes magnitude 260 and an angle, captures the system phase offset 240 at a selected probe position 246, and stores the system phase offset 240 under the key 244 formed from the probe identifier 256, the excitation frequency identifier 258, or a combination thereof thereby enabling single-point calibration in-air or at an approached Z-position.

For example, the right portion of FIG. 4 illustrates measurement and reconstruction. For subsequent measurements of the sample 114, the operational configuration unit 224 can compute the current phase θ, such as the uncalibrated phase 404 (θ), from the present RE/IM produced by the quadrature demodulation unit 216, including the second in-phase voltage 252 and the second quadrature voltage 254, retrieve the stored system phase offset 240 ($\theta_0$) via the key 244, and output a calibrated phase 242 ($\theta_s$) given by $\theta_s = \theta - \theta_0$. Using the magnitude 260 (R) from the calibration step and the calibrated phase 242 ($\theta_s$), the operational configuration unit 224 can reconstruct adjusted components as a calibrated signal vector 410 with a calibrated in-phase component 412 and a calibrated quadrature component 414, where the calibrated in-phase component 412 is $RE = R \cdot \cos\theta_s$ and the calibrated quadrature component 414 $IM = R \cdot \sin\theta_s$. For example, a sample 114 used for capturing the first response 230 of FIG. 2 can be the same as or different from a sample 114 used for capturing the second response 232 of FIG. 2.

It has been discovered that subtracting the stored system phase offset 240 per measurement to produce the calibrated phase 242 is mathematically equivalent to a constant rotation of the I/Q vector, which preserves the magnitude 260, thereby reducing setup time, eliminates iterative tuning, and yields stable, quantitative SMIM maps (magnitude/phase) across probes and frequencies via automatic recall using the key 244.

Figure 5:
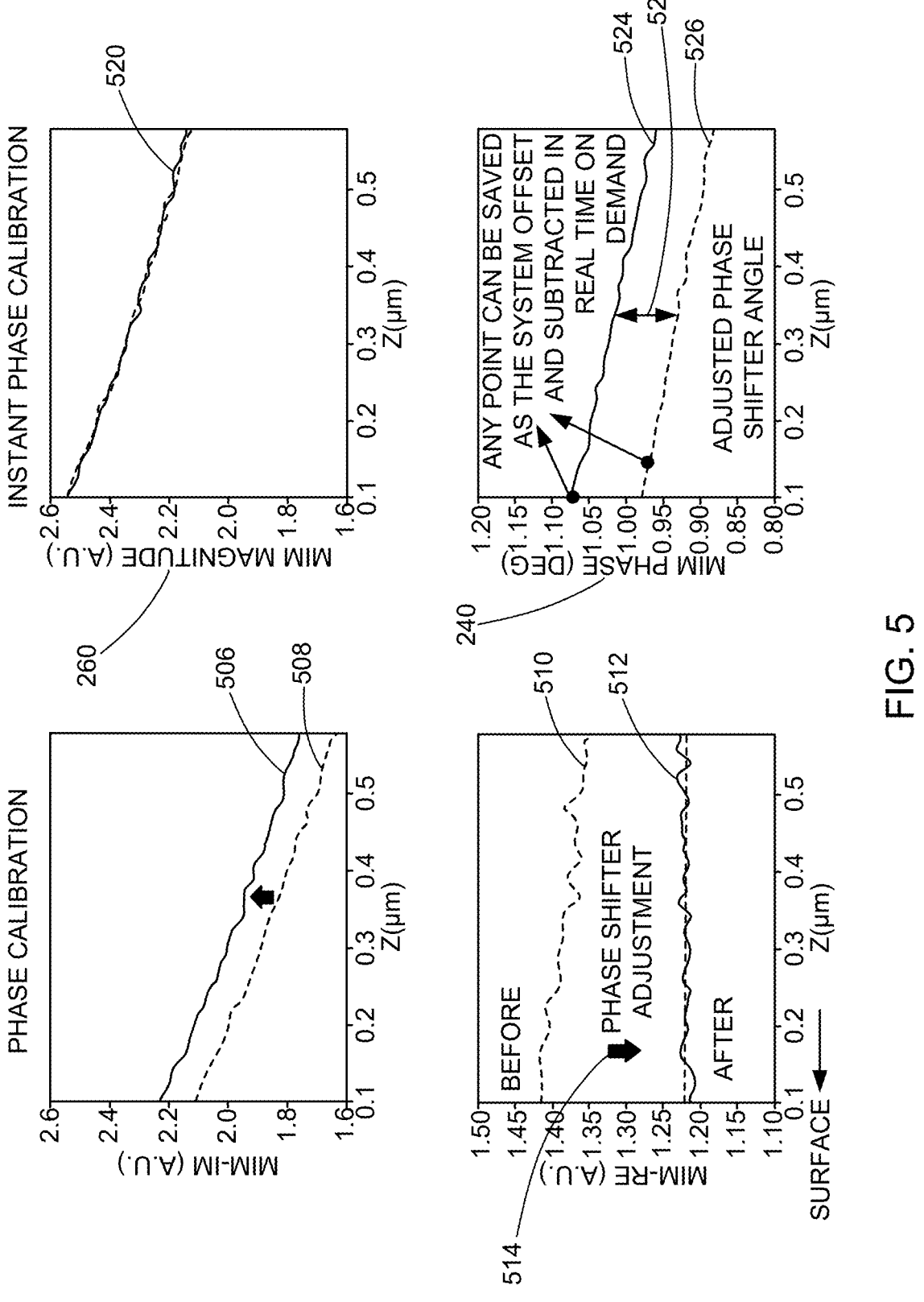
FIG. 5 are example plots of a magnitude and a phase offset in the in the phase calibration mode.

Referring now to FIG. 5, therein are shown example plots of a magnitude 260 and a phase offset 240 in the phase calibration mode. The top-left and bottom-left portions of FIG. 5 relate to the phase-shifter-based calibration mode described in FIG. 3, and the top-right and bottom-right portions of FIG. 5 relate to the instant phase calibration mode described in FIG. 4.

For example, the top-left portion illustrates the imaginary quadrature channel 312 of FIG. 3 (MIM-IM) output by the quadrature demodulation unit 216 of FIG. 2 can change as the probe 204 of FIG. 2 approaches the surface of the sample 114 of FIG. 1. The IM traces can be recorded as a first IM approach profile 506 and a second IM approach profile 508, each representing the MIM-IM value versus Z for its respective setting, where Z is the vertical component of the probe position 246 of FIG. 2 as the tip-sample height of the probe 204 relative to the sample 114.

For example, the bottom-left portion illustrates the real in-phase channel 310 of FIG. 3 (MIM-RE) produced by the quadrature demodulation unit 216 before and after a phase adjustment. The initial trace is stored as an RE-before profile 510 that corresponds to a first phase-shifter setting, and the adjusted trace is stored as an RE-after profile 512 that corresponds to a second phase-shifter setting. A phase-adjustment indicator 514 marks the action of rotating the phase shifter 302 of FIG. 3. The target is to approach the flat-response condition 314 of FIG. 3 (RE near a constant baseline across Z). For example, the RE-before profile 510 is a curve of the in-phase voltage versus Z showing a non-zero trend, and the RE-after profile 512 is a curve in which that trend is reduced after the adjustment.

For example, the top-right portion illustrates that the magnitude 260 computed by the operational configuration unit 224 from the I/Q components output by the quadrature demodulation unit 216 can remain essentially unchanged for different reference-phase settings during the same approach. The I/Q components can include the first in-phase voltage 248 of FIG. 2 and the first quadrature voltage 250 of FIG. 2, or the second in-phase voltage 252 of FIG. 2 and second quadrature voltage 254 of FIG. 2. The top-right portion illustrates a magnitude overlay profile 520 in which traces from the first and second phase settings overlap. The magnitude overlay profile 520 can indicate the magnitude 260 computed by the operational configuration unit 224 remains essentially unchanged versus Z for two different phase-shifter settings, where the magnitude 260 (R) expressed as $R=\sqrt{RE^2+IM^2}$ can be invariant to phase rotation.

For example, the bottom-right portion illustrates the phase angle computed by the operational configuration unit 224 for the two settings. Two traces are recorded: a first phase profile 524 for the first phase-shifter setting and a second phase profile 526 for the second phase-shifter setting. A phase-offset delta 528 represents the difference between the first phase profile 524 and the second phase profile 526 at the same probe position 246. A system-offset capture marker can be provided by the user 112 of FIG. 1 to select a preferred probe position 246 and record the corresponding phase value as the system phase offset 240, which the operational configuration unit 224 then stores under the key 244 of FIG. 2 and subtracts in real time during subsequent measurements. By way of an example, the system-offset capture marker is a user action (e.g., click or command) that binds the phase value at that Z value to the system phase offset 240 for the current probe identifier 256 of FIG. 2 or the excitation frequency identifier 258 of FIG. 2. The phase value at a user-preferred position can be saved as a system phase offset at the desired position. Any point along the phase curve can be saved as the system phase offset 240 and applied in real time on demand.

For illustration, the label "A.U." in the vertical axes denotes arbitrary units, meaning the vertical scale is normalized to the instrument/readout (consistent within a plot for comparison) rather than an absolute physical unit. Arbitrary units in the plots show shape and relative size, not a fixed physical unit.

Figure 6:
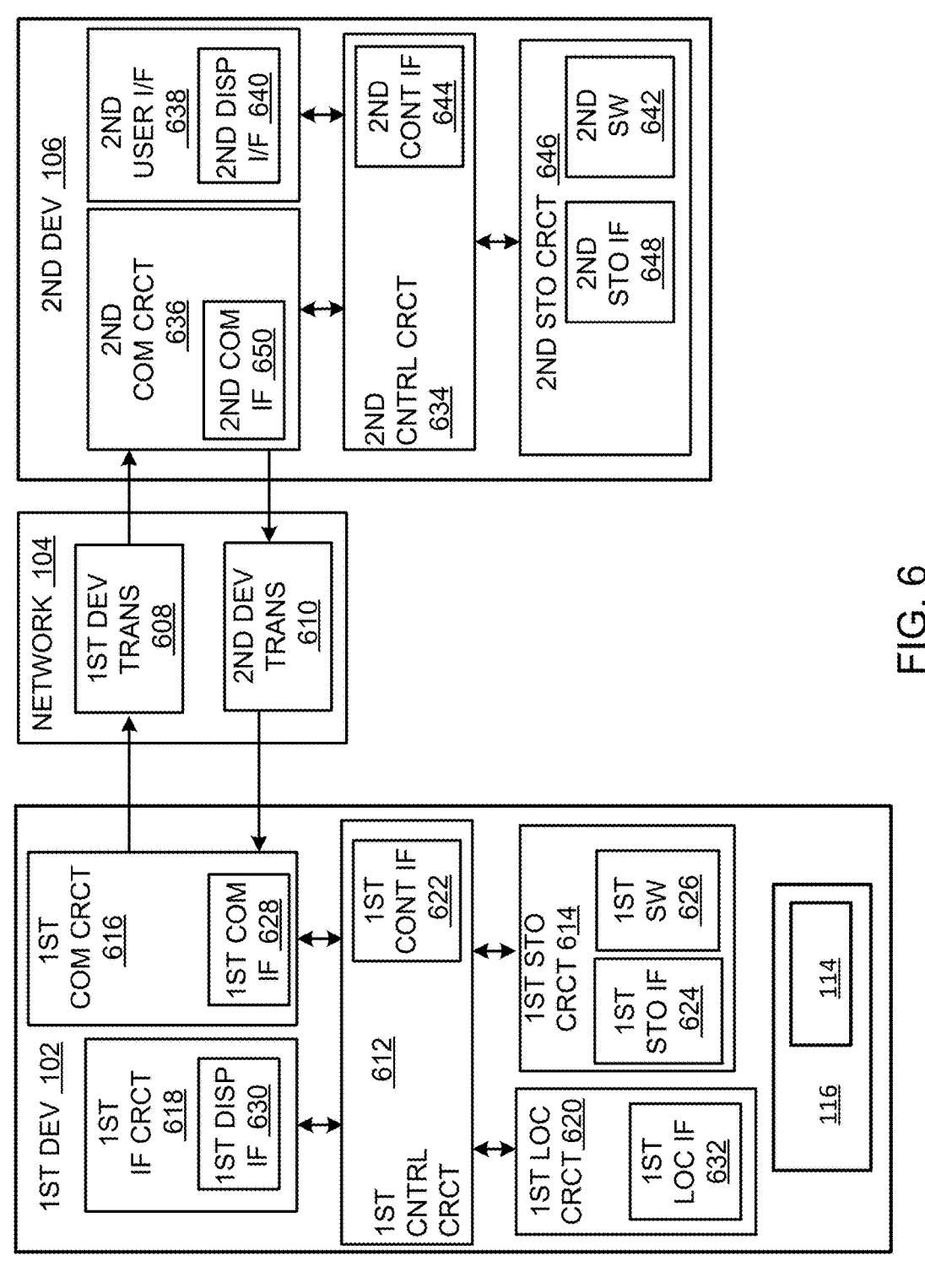
FIG. 6 is an exemplary block diagram of the measurement system in an embodiment.

Referring now to FIG. 6, therein is shown an exemplary block diagram of the measurement system 100 in an embodiment. The measurement system 100, a portion of the measurement system 100, or a combination thereof can execute the detection mechanism 116 of FIG. 1. The measurement system 100 can include the first device 102, the network 104, and the second device 106. The first device 102 can send information in a first device transmission 608 over the network 104 to the second device 106. The second device 106 can send information in a second device transmission 610 over the network 104 to the first device 102.

For illustrative purposes, the measurement system 100 is shown with the first device 102 as a client device, although it is understood that the measurement system 100 can include the first device 102 as a different type of device.

Also, for illustrative purposes, the measurement system 100 is shown with the second device 106 as a server, although it is understood that the measurement system 100 can include the second device 106 as a different type of device. For example, the second device 106 can be a client device. By way of an example, the measurement system 100 can be implemented entirely on the first device 102 with some functions of the detection mechanism 116 executed by a first control circuit 612.

Also, for illustrative purposes, the measurement system 100 is shown with interaction between the first device 102 and the second device 106. However, it is understood that the first device 102 can be a part of or the entirety of a tablet computer, a smart phone, or a combination thereof. Similarly, the second device 106 can similarly interact with the first device 102 representing the tablet computer, the smart phone, or a combination thereof. For example, the measurement system 100 can operate an atomic force microscope (AFM) including a SMIM module, in which the first device 102 controls probe motion and signal acquisition and the second device 106 performs impedance mapping or image reconstruction.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 612, a first storage circuit 614, a first communication circuit 616, a first interface circuit 618, and a first location circuit 620. The first control circuit 612 can include a first control interface 622. The first control circuit 612 can execute a first software 626 to provide the intelligence of the measurement system 100. The first control circuit 612 can execute portions of the operational configuration unit 224 of FIG. 2 as software/firmware, including generating coherent references for the quadrature demodulation unit 216 of FIG. 2, acquiring and time-stamping I/Q data from the probe 204 of FIG. 2, computing a system phase offset 240 of FIG. 2 at a reference position such as the probe position 246 of FIG. 2, forming a key 244 of FIG. 2 based on a probe identifier 256 of FIG. 2 or an excitation frequency identifier 258 of FIG. 2, storing the phase offset 240, and subtracting the stored phase offset 240 in real time to output a calibrated phase 242 of FIG. 2 together with a magnitude 260 of FIG. 2, or a combination thereof.

The first control circuit 612 can be implemented in a number of different manners. For example, the first control circuit 612 can be a processor, an application specific integrated circuit (ASIC), an embedded processor, a microprocessor, a hardware control logic, a hardware finite state machine (FSM), a digital signal processor (DSP), or a combination thereof. The first control interface 622 can be used for communication between the first control circuit 612 and other functional units or circuits in the first device 102. The first control interface 622 can also be used for communication that is external to the first device 102. The first control circuit 612 can process information associated with the sample 114 and execute portions of the detection mechanism 116.

The first control interface 622 can receive information from the other functional units/circuits or from external sources, or can transmit information to the other functional units/circuits or to external destinations. The external sources and the external destinations refer to sources and destinations external to the first device 102. The first control circuit 612 can generate and synchronize drive waveforms for the AFM scanner and the microwave excitation unit 202 of FIG. 2 and can receive feedback signals including cantilever deflection and SMIM baseband voltages. The first control circuit 612 can hold excitation frequency and power constant during calibration and measurement to stabilize the magnitude/phase readout and can gate I/Q acquisition based on the probe position 246 of FIG. 2 to align samples with pixels/lines.

The first control interface 622 can be implemented in different ways and can include different implementations depending on which functional units/circuits or external units/circuits are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, cantilever deflection sensor, piezoelectric scanner control, microwave circuitry, or a combination thereof.

The first storage circuit 614 can store the first software 626. The first storage circuit 614 can also store the relevant information, such as data representing incoming samples 114, a table of phase-offset entries indexed by the key 244 of FIG. 2, the detection mechanism 116 and the other embodiments, or a combination thereof.

The first storage circuit 614 can be a volatile memory, a nonvolatile memory, an internal memory, an external memory, or a combination thereof. For example, the first storage circuit 614 can be a nonvolatile storage such as non-volatile random-access memory (NVRAM), Flash memory, disk storage, or a volatile storage such as static random-access memory (SRAM).

The first storage circuit 614 can include a first storage interface 624. The first storage interface 624 can be used for communication between the first storage circuit 614 and other functional units or circuits in the first device 102. The first storage interface 624 can also be used for communication that is external to the first device 102.

The first storage interface 624 can receive information from the other functional units/circuits or from external sources, or can transmit information to the other functional units/circuits or to external destinations. The external sources and the external destinations refer to sources and destinations external to the first device 102. The first storage interface 624 can receive input from and source data to the detection mechanism 116.

The first storage interface 624 can include different implementations depending on which functional units/circuits or external units/circuits are being interfaced with the first storage circuit 614. The first storage interface 624 can be implemented with technologies and techniques similar to the implementation of the first control interface 622. The first storage circuit 614 can store AFM height data, SMIM impedance spectra, or combined datasets for later analysis or calibration.

The first communication circuit 616 can enable external communication to and from the first device 102. For example, the first communication circuit 616 can permit the first device 102 to communicate with the second device 106 and the network 104. The first communication circuit 616 can interact with the second device 106 for implementing the detection mechanism 116.

The first communication circuit 616 can also function as a communication hub allowing the first device 102 to function as part of the network 104 and not limited to be an endpoint or terminal circuit to the network 104. The first communication circuit 616 can include active and passive components, such as microelectronics or an antenna, for interaction with the network 104. The first communication circuit 616 can relay real-time AFM tip-position and SMIM signal data to the second device 106 for image formation.

The first communication circuit 616 can include a first communication interface 628.

The first communication interface 628 can be used for communication between the first communication circuit 616 and other functional units or circuits in the first device 102. The first communication interface 628 can receive information from the second device 106 for distribution to the other functional units/circuits or can transmit information to the other functional units or circuits.

The first communication interface 628 can include different implementations depending on which functional units or circuits are being interfaced with the first communication circuit 616. The first communication interface 628 can be implemented with technologies and techniques similar to the implementation of the first control interface 622.

The first interface circuit 618 allows the user 112 of FIG. 1 to interface and interact with the first device 102. The first interface circuit 618 can include an input device and an output device. Examples of the input device of the first interface circuit 618 can include a keypad, a touchpad, soft-keys, a keyboard, a microphone, a camera, an infrared sensor for receiving remote signals, or any combination thereof to provide data and communication inputs, such as the sample 114. The first interface circuit 618 can receive the sample 114 provided by the user 112 that can be manipulated by the first control circuit 612. The first interface circuit 618 can allow the user 112 to select scan regions, adjust probe-sample distance, and display SMIM amplitude or phase images. The first interface circuit 618 can provide controls to select a reference capture at a selected probe position 246 of FIG. 2 to store the system phase offset 240 of FIG. 2 under the key 244 of FIG. 2.

The first interface circuit 618 can include a first display interface 630. The first display interface 630 can include an output device. The first display interface 630 can include a projector, a video screen, a touch screen, a speaker, a microphone, a keyboard, and combinations thereof. The first display interface 630 can allow the user 112 to view the results of the detection mechanism 116 and the other embodiments on the output device.

The first control circuit 612 can operate the first interface circuit 618 to display information generated by the measurement system 100 and receive input from the user 112. The first control circuit 612 can also execute the first software 626 for the other functions of the measurement system 100, including receiving location information from the first location circuit 620. The first control circuit 612 can further execute the first software 626 for interaction with the network 104 via the first communication circuit 616. The first control circuit 612 can operate portions or all of the detection mechanism 116.

The first control circuit 612 can also receive location information from the first location circuit 620. The first control circuit 612 can operate the detection mechanism 116 or portions thereof. The first control circuit 612 can operate on information associated with the sample 114, as well as any of the output for the detection mechanism 116 and any of the embodiments for display to the user 112.

The first location circuit 620 can be implemented in many ways. For example, the first location circuit 620 can function as at least a part of the global positioning system, an inertial compute system, a cellular-tower location system, a gyroscope, or any combination thereof. Also, for example, the first location circuit 620 can utilize components such as an accelerometer, gyroscope, or global positioning system (GPS) receiver.

The first location circuit 620 can include a first location interface 632. The first location interface 632 can be used for communication between the first location circuit 620 and other functional units or circuits in the first device 102.

The first location interface 632 can receive information from the other functional units/circuits or from external sources, or can transmit information to the other functional units/circuits or to external destinations. The external sources and the external destinations refer to sources and destinations external to the first device 102. The first location interface 632 can receive the global positioning location from the global positioning system (not shown).

The first location interface 632 can include different implementations depending on which functional units/circuits or external units/circuits are being interfaced with the first location circuit 620. The first location interface 632 can be implemented with technologies and techniques similar to the implementation of the first control circuit 612.

The second device 106 can be optimized for implementing an embodiment of the present invention in a multiple device embodiment with the first device 102. The second device 106 can provide the additional or higher performance processing power compared to the first device 102. The second device 106 can include a second control circuit 634, a second communication circuit 636, a second user interface 638, and a second storage circuit 646.

The second user interface 638 allows an operator (not shown) to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or a combination thereof.

The second control circuit 634 can execute a second software 642 to provide the intelligence of the second device 106 of the measurement system 100. The second software 642 can operate in conjunction with the first software 626. The second control circuit 634 can provide additional performance compared to the first control circuit 612. The second control circuit 634 can execute instructions to implement all or some of the functions of the detection mechanism 116. The second control circuit 634 can execute portions of the operational configuration unit 224 of FIG. 2 to compute the magnitude 260 of FIG. 2 and the uncalibrated phase 404 of FIG. 4 from I/Q, determine and store the system phase offset 240 of FIG. 2 under the key 244 of FIG. 2, recall the stored phase offset 240 when the probe identifier 256 of FIG. 2 or the excitation frequency identifier 258 of FIG. 2 changes, and subtract the phase offset 240 in real time to produce the calibrated phase 242 of FIG. 2. The second control circuit 634 can also manage non-volatile persistence of calibration entries and provide remote visualization of magnitude/phase maps.

The second control circuit 634 can operate the second user interface 638 to display information. The second control circuit 634 can also execute the second software 642 for the other functions of the measurement system 100, including operating the second communication circuit 636 to communicate with the first device 102 over the network 104.

The second control circuit 634 can be implemented in a number of different manners.

For example, the second control circuit 634 can be a processor, an embedded processor, a microprocessor, hardware control logic, a hardware finite state machine (FSM), a digital signal processor (DSP), or a combination thereof.

The second control circuit 634 can include a second control interface 644. The second control interface 644 can be used for communication between the second control circuit 634 and other functional units or circuits in the second device 106. The second control interface 644 can also be used for communication that is external to the second device 106.

The second control interface 644 can receive information from the other functional units/circuits or from external sources, or can transmit information to the other functional units/circuits or to external destinations. The external sources and the external destinations refer to sources and destinations external to the second device 106.

The second control interface 644 can be implemented in different ways and can include different implementations depending on which functional units/circuits or external units/circuits are being interfaced with the second control interface 644. For example, the second control interface 644 can be implemented with a pressure sensor, an inertial sensor, a microelectromechanical system (MEMS), optical circuitry, waveguides, wireless circuitry, wireline circuitry, or a combination thereof.

The second storage circuit 646 can store the second software 642. The second storage circuit 646 can also store the information such as data representing incoming sample 114, data representing, including but not limited to sound files, or a combination thereof. The second storage circuit 646 can be sized to provide the additional storage capacity to supplement the first storage circuit 614.

For illustrative purposes, the second storage circuit 646 is shown as a single element, although it is understood that the second storage circuit 646 can be a distribution of storage elements. Also, for illustrative purposes, the measurement system 100 is shown with the second storage circuit 646 as a single hierarchy storage system, although it is understood that the measurement system 100 can include the second storage circuit 646 in a different configuration. For example, the second storage circuit 646 can be formed with different storage technologies forming a memory hierarchal system including different levels of caching, main memory, rotating media, or off-line storage.

The second storage circuit 646 can be a controller of a volatile memory, a nonvolatile memory, an internal memory, an external memory, or a combination thereof. For example, the second storage circuit 646 can be a controller of a nonvolatile storage such as non-volatile random-access memory (NVRAM), Flash memory, disk storage, or a volatile storage such as static random access memory (SRAM). The second storage circuit 646 can store AFM topography maps, SMIM amplitude and phase data, and derived property maps including conductivity or permittivity.

The second storage interface 648 can receive information from the other functional units/circuits or from external sources, or can transmit information to the other functional units/circuits or to external destinations. The external sources and the external destinations refer to sources and destinations external to the second device 106.

The second storage interface 648 can include different implementations depending on which functional units/circuits or external units/circuits are being interfaced with the second storage circuit 646. The second storage interface 648 can be implemented with technologies and techniques similar to the implementation of the second control interface 644.

The second communication circuit 636 can enable external communication to and from the second device 106. For example, the second communication circuit 636 can permit the second device 106 to communicate with the first device 102 over the network 104.

The second communication circuit 636 can also function as a communication hub allowing the second device 106 to function as part of the network 104 and not limited to be an endpoint or terminal unit or circuit to the network 104. The second communication circuit 636 can include active and passive components, such as microelectronics or an antenna, for interaction with the network 104.

The second communication circuit 636 can include a second communication interface 650. The second communication interface 650 can be used for communication between the second communication circuit 636 and other functional units or circuits in the second device 106. The second communication interface 650 can receive information from the other functional units/circuits or can transmit information to the other functional units or circuits.

The second communication interface 650 can include different implementations depending on which functional units or circuits are being interfaced with the second communication circuit 636. The second communication interface 650 can be implemented with technologies and techniques similar to the implementation of the second control interface 644. The second communication circuit 636 can support remote microscope monitoring and cloud-based data processing for AFM/SMIM imaging.

The second communication circuit 636 can couple with the network 104 to send information to the first device 102. The first device 102 can receive information in the first communication circuit 616 from the second device transmission 610 of the network 104. The measurement system 100 can be executed by the first control circuit 612, the second control circuit 634, or a combination thereof. For illustrative purposes, the second device 106 is shown with the partition including the second user interface 638, the second storage circuit 646, the second control circuit 634, and the second communication circuit 636, although it is understood that the second device 106 can include a different partition. For example, the second software 642 can be partitioned differently such that some or all of its function can be in the second control circuit 634 and the second communication circuit 636. Also, the second device 106 can include other functional units or circuits not shown in FIG. 6 for clarity. As an example for tight timing, the first control circuit 612 can execute time-critical acquisition, gating by probe position 246 of FIG. 2, and reference-capture operations of the operational configuration unit 224 of FIG. 2, while the second control circuit 634 can execute compute-intensive magnitude/phase calculations, key management, and real-time phase-offset subtraction.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium including instructions for performing the software function of the detection mechanism 116, a portion therein, or a combination thereof.

For illustrative purposes, the measurement system 100 is described by operation of the first device 102 and the second device 106. It is understood that the first device 102 and the second device 106 can operate any of the modules or units and functions of the measurement system 100 including a distribution of the functions of the detection mechanism 116. For example, the modules or units include the AFM scanner control, SMIM excitation and detection electronics, the image-processing software, or a combination thereof.

Figure 7:
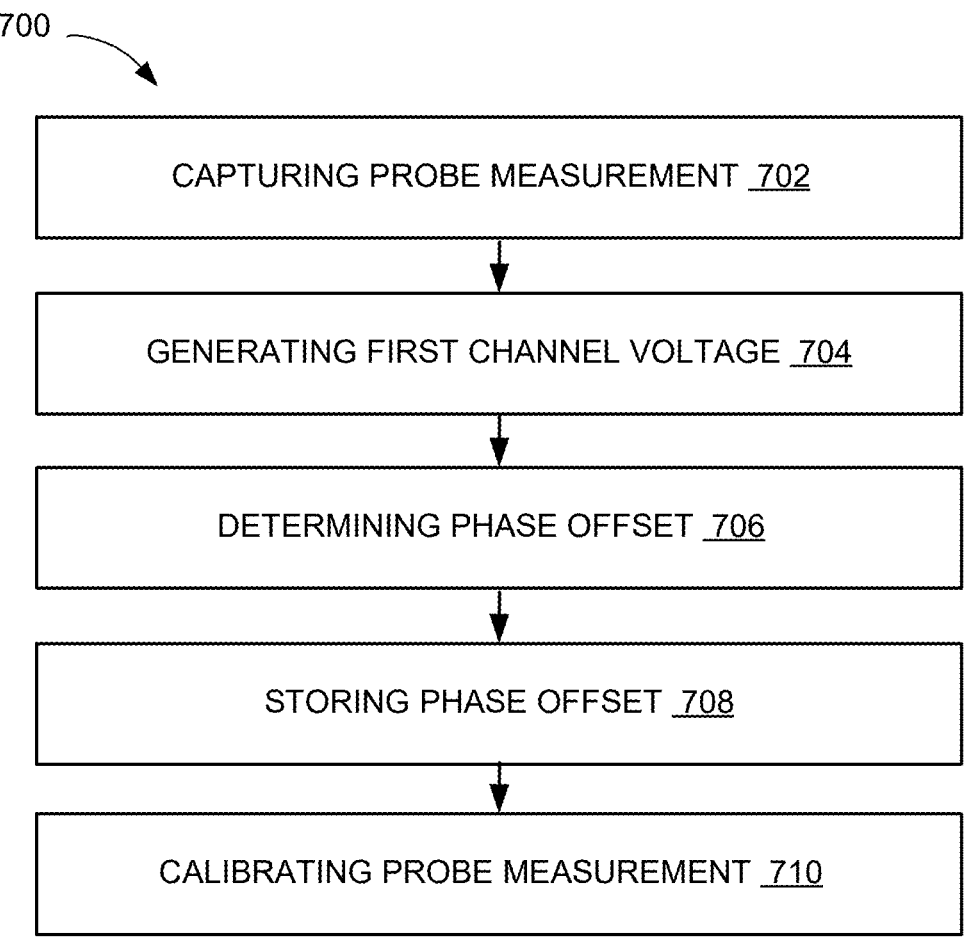
FIG. 7 is a flow chart of a method of operation of a measurement system in an embodiment of the present invention.

Referring now to FIG. 7, therein is shown a flow chart of a method 700 of operation of a measurement system 100 of FIG. 1 in an embodiment of the present invention. The method 700 includes: capturing a probe measurement associated with a key, where the probe measurement is a first response or a second response based on a first microwave excitation or a second microwave excitation, respectively, in a block 702; generating a first channel voltage or a second channel voltage based on the first response or the second response, respectively, in a block 704; determining a phase offset based on the first channel voltage in a block 706; storing the phase offset associated with the key in a block 708; and calibrating the probe measurement by adjusting a phase based on computation of the second channel voltage with the phase offset accessed by the key in a block 710.

One or more embodiments provide AFM with SMIM, where accurate quantitation can involve phase calibration of the RE/IM channels using an analog phase shifter and repeated adjustments during standard-sample scans or Z-sweeps, a process made slower by probe/frequency-dependent offsets and limited RF bandwidth. Instead of using an analog phase shifter to nullify the phase offset, in-phase and quadrature phase components from the RF electronics are directly used to calculate the magnitude and angle of an RF signal. With the converted signals, the phase calibration process is simplified as a one-time simple subtraction in angle without recursive adjustments of the phase shifter. As a result, setup time is reduced, usable RF bandwidth is broadened, and SMIM readouts become simpler and more quantitative in magnitude/angle form.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A measurement system comprising:
an impedance detection unit configured to:
    capture a probe measurement associated with a key, where the probe measurement is a first response or a second response based on a first microwave excitation or a second microwave excitation, respectively;
    generate a first channel voltage or a second channel voltage based on the first response or the second response, respectively;
    determine a phase offset based on the first channel voltage;
    store the phase offset associated with the key; and
    calibrate the probe measurement by adjusting a phase based on computation of the second channel voltage with the phase offset accessed by the key.

2. The measurement system as claimed in claim 1 wherein the impedance detection unit is configured to calibrate the probe measurement including subtracting the phase offset from the phase.

3. The measurement system as claimed in claim 1 wherein the impedance detection unit is configured to generate the first channel voltage based on a probe position relative to a sample.

4. The measurement system as claimed in claim 1 wherein the impedance detection unit is configured to:
    generate the first channel voltage including generating a first in-phase voltage and a first quadrature voltage based on the first response; and
    determine the phase offset based on the first in-phase voltage and the first quadrature voltage.

5. The measurement system as claimed in claim 1 wherein the impedance detection unit is configured to:
    generate the second channel voltage including generating a second in-phase voltage and a second quadrature voltage based on the second response; and
    calibrate the probe measurement by adjusting the phase based on computation of the second in-phase voltage and the second quadrature voltage with the phase offset accessed by the key.

6. The measurement system as claimed in claim 1 wherein the impedance detection unit is configured to:
    determine the key based on a probe identifier for access to the phase offset; and
    calibrate the probe measurement by adjusting the phase based on computation of the second channel voltage with the phase offset accessed by the key determined based on the probe identifier.

7. The measurement system as claimed in claim 1 wherein the impedance detection unit is configured to:
    determine the key based on an excitation frequency identifier for access to the phase offset; and
    calibrate the probe measurement by adjusting the phase based on computation of the second channel voltage with the phase offset accessed by the key determined based on the excitation frequency identifier.

8. A method of operation of a measurement system comprising:
    capturing a probe measurement associated with a key, where the probe measurement is a first response or a second response based on a first microwave excitation or a second microwave excitation, respectively;

generating a first channel voltage or a second channel voltage based on the first response or the second response, respectively;
    determining a phase offset based on the first channel voltage;
    storing the phase offset associated with the key; and
    calibrating the probe measurement by adjusting a phase based on computation of the second channel voltage with the phase offset accessed by the key.

9. The method as claimed in claim 8 wherein calibrating the probe measurement includes subtracting the phase offset from the phase.

10. The method as claimed in claim 8 wherein generating the first channel voltage includes generating the first channel voltage based on a probe position relative to a sample.

11. The method as claimed in claim 8 wherein:
    generating the first channel voltage includes generating a first in-phase voltage and a first quadrature voltage based on the first response; and
    determining the phase offset includes determining the phase offset based on the first in-phase voltage and the first quadrature voltage.

12. The method as claimed in claim 8 wherein:
    generating the second channel voltage includes generating a second in-phase voltage and a second quadrature voltage based on the second response; and
    calibrating the probe measurement by adjusting the phase based on computation of the second in-phase voltage and the second quadrature voltage with the phase offset accessed by the key.

13. The method as claimed in claim 8 further comprising:
    determining the key based on a probe identifier for access to the phase offset; and
wherein:
    calibrating the probe measurement includes calibrating the probe measurement by adjusting the phase based on computation of the second channel voltage with the phase offset accessed by the key determined based on the probe identifier.

14. The method as claimed in claim 8 further comprising:
    determining the key based on an excitation frequency identifier for access to the phase offset; and
wherein:
    calibrating the probe measurement includes calibrating the probe measurement by adjusting the phase based on computation of the second channel voltage with the phase offset accessed by the key determined based on the excitation frequency identifier.

15. A non-transitory computer-readable medium storing an instruction that, when executed by a control circuit of a measurement system, causes the control circuit to perform functions comprising:
    capturing a probe measurement associated with a key, where the probe measurement is a first response or a second response based on a first microwave excitation or a second microwave excitation, respectively;
    generating a first channel voltage or a second channel voltage based on the first response or the second response, respectively;
    determining a phase offset based on the first channel voltage;
    storing the phase offset associated with the key; and
    calibrating the probe measurement by adjusting a phase based on computation of the second channel voltage with the phase offset accessed by the key.

16. The non-transitory computer-readable medium as claimed in claim 15 wherein calibrating the probe measurement includes subtracting the phase offset from the phase.

17. The non-transitory computer-readable medium as claimed in claim 15 wherein generating the first channel voltage includes generating the first channel voltage based on a probe position relative to a sample.

18. The non-transitory computer-readable medium as claimed in claim 15 wherein:

generating the first channel voltage includes generating a first in-phase voltage and a first quadrature voltage based on the first response; and determining the phase offset includes determining the phase offset based on the first in-phase voltage and the first quadrature voltage.

19. The non-transitory computer-readable medium as claimed in claim 15 wherein:

generating the second channel voltage includes generating a second in-phase voltage and a second quadrature voltage based on the second response; and calibrating the probe measurement by adjusting the phase based on computation of the second in-phase voltage and the second quadrature voltage with the phase offset accessed by the key.

20. The non-transitory computer-readable medium as claimed in claim 15 further comprising:

determining the key based on a probe identifier for access to the phase offset; and wherein:

calibrating the probe measurement includes calibrating the probe measurement by adjusting the phase based on computation of the second channel voltage with the phase offset accessed by the key determined based on the probe identifier.

* * * * *